(12) United States Patent
Jeong et al.

(10) Patent No.: US 10,073,510 B2
(45) Date of Patent: *Sep. 11, 2018

(54) METHOD AND APPARATUS FOR CONTROLLING AN OPERATION MODE OF A MOBILE TERMINAL

(71) Applicant: Samsung Electronics Co., Ltd., Gyeonggi-do (KR)

(72) Inventors: Yong-Soo Jeong, Gyeonggi-do (KR); Jin Park, Gyeonggi-do (KR); Min-Ji Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/847,455

(22) Filed: Sep. 8, 2015

(65) Prior Publication Data

US 2015/0378421 A1    Dec. 31, 2015

Related U.S. Application Data

(63) Continuation of application No. 13/591,769, filed on Aug. 22, 2012, now Pat. No. 9,152,209.

(30) Foreign Application Priority Data

Aug. 30, 2011    (KR) .................. 10-2011-0087425

(51) Int. Cl.
*G06F 1/32* (2006.01)
*G06F 3/01* (2006.01)
*H04W 52/02* (2009.01)

(52) U.S. Cl.
CPC ............ *G06F 1/3228* (2013.01); *G06F 1/325* (2013.01); *G06F 1/3231* (2013.01);
(Continued)

(58) Field of Classification Search
CPC .. H04W 52/00; H04W 52/02; H04N 5/23241; G06F 1/3203
See application file for complete search history.

(56) References Cited

U.S. PATENT DOCUMENTS 6,401,209 B1    6/2002    Klein
6,665,805 B1    12/2003    Tsirkel et al.
(Continued)

FOREIGN PATENT DOCUMENTS

EP    2 096 624 A1    9/2009
JP    2008-209610 A    9/2008
(Continued)

OTHER PUBLICATIONS

Korean Search Report dated Mar. 15, 2017.

*Primary Examiner* — Kamran Afshar
*Assistant Examiner* — Farideh Madani
(74) *Attorney, Agent, or Firm* — Cha & Reiter, LLC.

(57) ABSTRACT

A method and apparatus for controlling an operation mode in a mobile terminal provides the mobile terminal to determine whether a predetermined time has elapsed, after a lapse of which it enters a first power-saving mode, and drive a camera module if the predetermined time has elapsed. Meanwhile, the mobile terminal determines whether a predetermined subject is recognized by the camera module, and then delays changing to the first power-saving mode if the predetermined subject is recognized, and enters the first power-saving mode if the predetermined subject is not recognized.

20 Claims, 5 Drawing Sheets

(52) U.S. Cl.
CPC ............ *G06F 1/3265* (2013.01); *G06F 3/013* (2013.01); *H04W 52/0254* (2013.01); *Y02D 10/153* (2018.01); *Y02D 10/173* (2018.01); *Y02D 70/1242* (2018.01); *Y02D 70/142* (2018.01); *Y02D 70/144* (2018.01); *Y02D 70/164* (2018.01)

(56) References Cited

U.S. PATENT DOCUMENTS

| | | |
|---|---|---|
| 7,091,471 B2 | 8/2006 | Wenstrand et al. |
| 7,636,456 B2 | 12/2009 | Collins et al. |
| 8,331,993 B2 | 12/2012 | Lee et al. |
| 8,489,150 B2 | 7/2013 | Lee et al. |
| 8,639,279 B2 | 1/2014 | Zhou et al. |
| 8,902,155 B2 * | 12/2014 | Kabasawa ............... G01C 17/28 |
| | | 345/156 |
| 2005/0193144 A1 | 9/2005 | Hassan et al. |
| 2005/0198661 A1 | 9/2005 | Collins et al. |
| 2005/0289363 A1 | 12/2005 | Tsirkel et al. |
| 2006/0110008 A1 | 5/2006 | Vertegaal et al. |
| 2007/0078552 A1 | 4/2007 | Rosenberg |
| 2007/0150842 A1 | 6/2007 | Chaudhri et al. |
| 2008/0118152 A1 | 5/2008 | Thorn et al. |
| 2008/0266331 A1 * | 10/2008 | Chen ................... G09G 3/3406 |
| | | 345/690 |
| 2008/0303443 A1 | 12/2008 | Tran et al. |
| 2009/0009665 A1 | 1/2009 | Tsutsumi et al. |
| 2009/0082066 A1 | 3/2009 | Katz |
| 2009/0195563 A1 * | 8/2009 | Xu ........................ G09G 3/2081 |
| | | 345/690 |
| 2010/0005523 A1 | 1/2010 | Hassan et al. |
| 2010/0042827 A1 | 2/2010 | Pratt et al. |
| 2010/0079508 A1 | 4/2010 | Hodge et al. |
| 2010/0259387 A1 | 10/2010 | Jiang |
| 2010/0295839 A1 | 11/2010 | Nagaya et al. |
| 2011/0037866 A1 | 2/2011 | Iwamoto |
| 2011/0103643 A1 * | 5/2011 | Salsman ............ G06K 9/00261 |
| | | 382/103 |
| 2011/0134819 A1 * | 6/2011 | Moritomo ......... H04W 52/0203 |
| | | 370/311 |
| 2011/0159864 A1 * | 6/2011 | Park ....................... H03K 17/96 |
| | | 455/418 |
| 2011/0205148 A1 * | 8/2011 | Corriveau ................. G09B 5/06 |
| | | 345/156 |
| 2011/0256848 A1 | 10/2011 | Bok et al. |
| 2011/0262044 A1 | 10/2011 | Wang |
| 2012/0280917 A1 * | 11/2012 | Toksvig ................. G06F 1/1626 |
| | | 345/173 |
| 2012/0331548 A1 | 12/2012 | Tseng et al. |
| 2013/0116013 A1 * | 5/2013 | Lee .......................... H04M 1/67 |
| | | 455/566 |

FOREIGN PATENT DOCUMENTS

| | | |
|---|---|---|
| JP | 2009-252650 A | 10/2009 |
| JP | 2010-271339 A | 12/2010 |
| KR | 2002-0093426 A | 12/2002 |
| KR | 10-2004-0026560 A | 3/2004 |
| KR | 10-2004-0110284 A | 12/2004 |
| KR | 10-2006-0044206 A | 5/2006 |
| KR | 10-2006-0091969 A | 8/2006 |
| KR | 10-2010-0053144 A | 5/2010 |

* cited by examiner

METHOD AND APPARATUS FOR CONTROLLING AN OPERATION MODE OF A MOBILE TERMINAL

CROSS RELATED APPLICATION(S)

This application is a Continuation of U.S. patent application Ser. No. 13/591,769 filed on Aug. 22, 2012 which claims the benefit under 35 U.S.C. § 119(a) of a Korean Patent Application filed in the Korean Intellectual Property Office on Aug. 30, 2011 and assigned Serial No. 10-2011-0087425, the entire disclosure of which is incorporated herein by reference.

BACKGROUND

Field of the Invention

The present invention relates generally to mobile terminals, and more particularly, to controlling an operation mode in mobile terminals.

Description of the Related Art

Mobile terminals such as smart phones and tablet Personal Computers (PCs) have become the most important item an individual can own. They serve as a communication tool used to make and receive calls as well as send text messages, listen to music, play mobile games, surf the Internet.

Due to the variety of functions offered in mobile terminals, users tend to use the mobile terminals more frequently and extensively. As these terminals are utilized for longer periods of time, batteries are drained more rapidly. In order to improve the battery life, many efforts have been made to maximize the run-time of mobile terminals by minimizing power consumption of the mobile terminals based on a variety of techniques.

Among them is a technique of switching an operation mode of mobile terminals to a dimming mode and a lock screen mode to minimize power consumption during idle mode.

In the dimming mode, if a user does not manipulate a mobile terminal indicting an inactive mode for a predetermined time period, the mobile terminal decreases a brightness to minimize the power consumed by its display screen (e.g., Liquid Crystal Display (LCD)). In the lock screen mode, if the user does not manipulate the mobile terminal for a predetermined time period even after the mobile terminal entered the dimming mode, the mobile terminal disables the display screen to prevent the display from consuming any power.

However, the above conventional mobile terminals frequently enter the dimming mode and the lock screen mode even a user is actively using the terminals. For example, when a mobile user is reading a lengthy article while surfing the Internet, if there is no user input or no manipulation of screen for a predetermined time period, the mobile terminal may enter the dimming mode to decrease the brightness of the display screen even though the user is actively reading the article, thus causing inconvenience to the users who manually have to revert back to the active mode.

Accordingly, there is a need for a way to minimize power consumption of mobile terminals without causing inconvenience to the users during the operation of the mobile terminals.

SUMMARY

An aspect of an exemplary embodiment of the present invention is to address the above problems associated in the prior art by providing a method and apparatus for minimizing power consumption of mobile terminals during an active mode without causing inconvenience to the users by powering down the mobile terminal inadvertently.

In accordance with one aspect of the present invention, a method for controlling an operation mode in a mobile terminal includes: driving a camera module when a predetermined duration corresponding to an inactive mode of the mobile terminal has elapsed; determining whether a predetermined subject is recognized (or detected) by the camera module; postponing entering the first power-saving mode if the predetermined subject is recognized; and entering the first power-saving mode if the predetermined subject is not recognized.

In accordance with another aspect of the present invention, an apparatus for controlling an operation mode in a mobile terminal includes: a display; a camera module; and a controller for driving a camera module when a predetermined duration corresponding to an inactive mode of the mobile terminal has elapsed; driving the camera module if the predetermined time duration has elapsed, determining whether a predetermined subject is recognized or detected by the camera module, postponing entering the first power-saving mode if the predetermined subject is recognized, and entering the first power-saving mode if the predetermined subject is not recognized.

In accordance with yet another aspect of the present invention, a method for controlling an operation mode in a mobile terminal includes: determining whether a predetermined subject is recognized or detected by a camera module; postponing an entry into a first power-saving mode when the predetermined subject is recognized; and entering the first power-saving mode if the predetermined subject is not recognized within a predefined time period.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION

Figure 1:
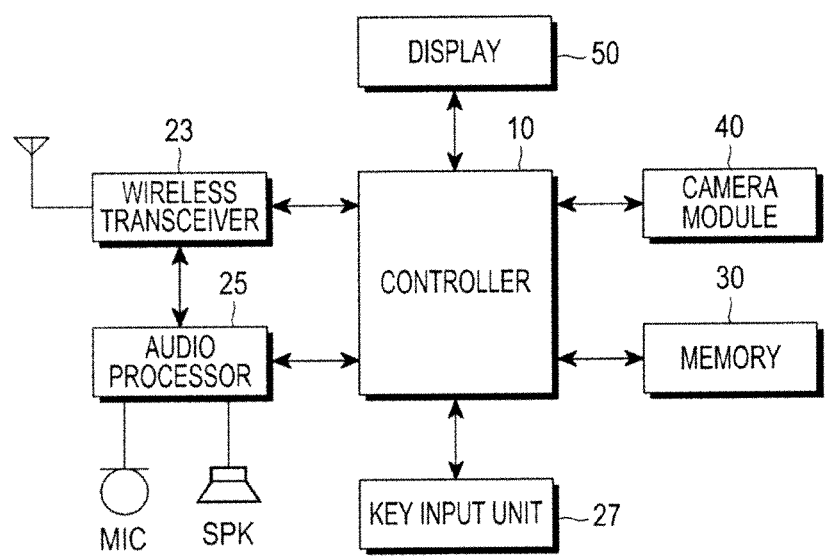
FIG. 1 is a block diagram of a mobile terminal according to an embodiment of the present invention.

Preferred embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Mobile terminals, to which exemplary embodiments of the present invention are applicable, are portable mobile electronic devices, which may include video phones, mobile phones, smart phones, International Mobile Telecommunication-2000 (IMT-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, E-Book terminals, portable computers (e.g., laptop computers and tablet PCs), digital cameras, and handheld game consoles.

Hereinafter, a mobile terminal according to an embodiment of the present invention will be described below with reference to FIG. 1. As shown, the mobile terminal may include a controller 10, a wireless transceiver 23, an audio processor 25, a key input unit 27, a memory 30, a camera module 40, a display 50.

The wireless transceiver 23 includes a Radio Frequency (RF) unit and a modulator/demodulator (modem). The RF unit includes an RF transmitter for up-converting a frequency of transmission signals and amplifying the up-converted transmission signals, and an RF receiver for low-noise-amplifying received signals and down-converting a frequency of the amplified received signals. The modem includes a transmitter for encoding and modulating transmission signals, and a receiver for demodulating and decoding signals received from the RF unit.

An audio processor 25 may constitute a coder/decoder (codec), and the codec includes a data codec and an audio codec. The data codec processes digital signals such as packet data, and the audio codec processes audio signals such as voice and multimedia files. The audio processor 25 may convert digital audio signals received from the modem into analog audio signals by means of the audio codec and play the analog audio signals using a speaker SPK. The audio processor 25 may convert analog audio signals picked up by a microphone MIC into digital audio signals by means of the audio codec and transfers the digital audio signals to the modem. The codec may be provided separately, or may be included in a controller 10.

In accordance with an embodiment of the present invention, the audio processor 25 may notify the user of the switching of an operation mode of the mobile terminal, with an audio notification. More specifically, if an operation of the mobile terminal is switched to the dimming mode or the lock screen mode, the audio processor 25 may notify the user of the switching of the operation mode using audio signals via the speaker SPK. Alternatively, the notification can be sent using a blink light or vibration signals.

A key input unit 27 may include keys needed to input numeric and character information, and function keys or a touch pad needed to set various functions. When a display 50 is implemented to have a capacitive or resistive touch screen, the key input unit 27 may include a minimum number of predetermined keys, and the display 50 may replace some of the key input functions of the key input unit 27.

Using the key input unit 27, the user may manually switch an operation mode of the mobile terminal to the dimming mode or the lock screen mode by inputting or pressing down a predetermined key. Using the key input unit 27 and/or the display 50, the user may also release the first or second power-saving mode he or she has entered, thus switching back to the normal operation mode of the mobile terminal.

A memory 30 may include a program memory and a data memory. The program memory stores a program for controlling the general operation of the mobile terminal. The memory 30 may further include an external memory such as a Compact Flash (CF) card, a Secure Digital (SD) card, a Micro Secure Digital (Micro-SD) card, a Mini Secure Digital (Mini-SD) card, an Extreme Digital (xD) card, and a memory stick. The memory 30 may also include a storage disk such as a Hard Disk Drive (HDD) and a Solid State Disk (SDD).

A camera module 40 converts optical signals received from or captured by its lens into electrical image signals, and outputs the electrical image signals. In this manner, the user may capture images and/or videos. Although not separately shown, the camera module 40 may include at least one lens for condensing light and delivering the condensed light to a camera sensor, the camera sensor for converting optical signals generated during image capturing mode into electrical image signals, a camera memory for temporarily storing the captured images, a flash lamp for providing a proper amount of light depending on the circumstances during image capturing, and a camera controller for controlling the overall operation of the camera module 40 and converting analog image signals captured by the camera sensor into digital image data.

Figure 3A:
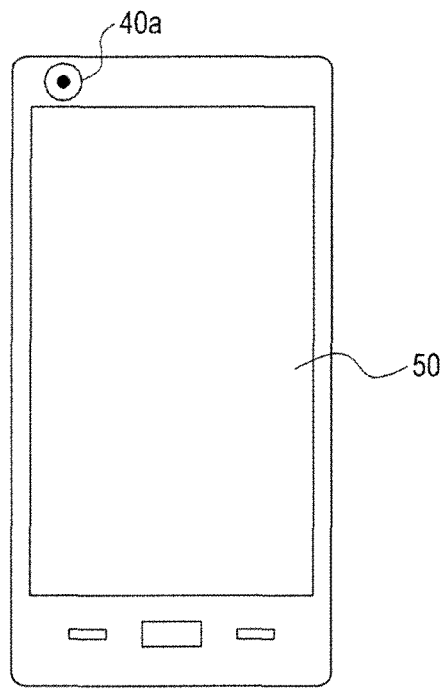
FIG. 3A and FIG. 3B show a first example of a method of controlling an operation mode in a mobile terminal according to an embodiment of the present invention.

Although the mobile terminal may include a plurality of camera modules 40 to capture images from different angles, for example front or back, it will be assumed in an embodiment of the present invention that the mobile terminal detects a predetermined subject using a front camera module 40a that is mounted on the same surface as the display 50 as shown in FIG. 3A.

In the embodiment, the camera module 40 is used to detect a predetermined subject, and based the detection outcome, the mobile terminal may determine whether to enter the first power-saving mode or the second power-saving mode. The predetermined subject may be a person's face including as the mobile user's face.

In an alternative embodiment of the present invention, the camera module 40 may be used to recognize a person's iris and detect movement of the iris, so such iris detection and or its movement may be interpreted to determine whether a person's gaze faces toward the display 50. Therefore, the mobile terminal may determine whether the person's gaze faces toward the display 50 by means of the camera module 40, and based thereon, determine whether it will enter the first power-saving mode or the second power-saving mode. The technology of recognizing movement of the iris by means of the camera module 40 and determining whether the person's gaze faces toward the display 50 is well known in the art, so a detailed description thereof will be omitted.

The controller 10 controls the overall operation of the mobile terminal, and may switch and control the operation of the mobile terminal depending on the user input received from the key input unit 27 and/or the display 50.

In accordance with an embodiment of the present invention, the controller 10 switches an operation mode of the mobile terminal to the dimming mode (or a first power-saving mode) or the lock screen mode (or a second power-switching mode) if predetermined conditions are satisfied. For example, the controller 10 may switch an operation mode of the mobile terminal to the first power-saving mode or the second power-saving mode, if a user input (e.g., a key input made by the user on the key input unit 27 or the touch screen of the display 50), which makes it possible to determine that the user is continuously using or manipulating the mobile terminal, does not occur for a predetermined duration. Generally, a power-saving mode refers to several modes such as down-clocking an operation clock of the controller 10 and turning off the audio processor 25, but in the embodiment of the present invention and for illustrative purposes, an entry into the first power-saving mode is assumed to be an entry into the dimming mode, and an entry into the second power-saving mode is assumed to be an entry into the lock screen mode.

Alternatively, the controller 10 may additionally adjust a gamma value and a contrast value of the display 50 to further minimize the power consumption of a battery (not shown) when the mobile terminal enters the dimming mode. This will be described later in details with reference to FIG. 5.

The display 50, which may be made of Liquid Crystal Display (LCD) or Organic Light Emitting Diode (OLED) which is classified into Passive Mode OLED (PMOLED) and an Active Mode OLED (AMOLED), outputs or displays various display information generated in the mobile terminal. The display 50, which includes a capacitive or resistive touch screen, may serve as an input unit for controlling the mobile terminal, together with the key input unit 27. Although not separately shown, the display 50 may include a panel, a driver Integrated Circuit (IC), a Flexible Printed Circuit Board (FPCB), and a backlight unit which is included when the display 50 is an LCD display.

In accordance with an embodiment of the present invention, the display 50 may provide the dimming function in which a brightness of the display 50 is selectively adjusted depending on the power supplied thereto, which is adjusted under control of the controller 10 and the driver IC. The dimming of the screen can be performed gradually, or set to dime the screen by a predetermined amount. For the dimming function, the power supplied to a backlight unit including Cold Cathode Florescent Lamp (CCFL) or LED is adjusted, if the display 50 is an LCD display, and a brightness of all pixels (or individual pixels) constituting the display 50 is adjusted, if the display 50 is an OLED display. The display 50 may provide the lock screen function that disables, under control of the controller 10, the touch screen feature of the display 50 after a lapse of a predetermined time, until the lock manually is released by a user.

The display 50 may additionally adjust its gamma value and contrast value under control of the controller 10 to minimize the power consumption of the battery when the mobile terminal enters the dimming mode (for example, if a brightness of the display 50 is decreased). In other words, the display 50 may display a distorted display screen in which a gamma value and a contrast value are additionally adjusted (e.g., down-adjusted) so that the black pixels may outnumber the white pixels, in the state where a display brightness (of the display screen) decreases (for example, brightness properties of the display 50 are down-adjusted) compared to before the mobile terminal enters the dimming mode, as the mobile terminal enters the dimming mode.

Although the devices which may be included in the mobile terminal, such as a Ground Positioning System (GPS) module, a Bluetooth module, a Wireless Fidelity (Wi-Fi) module, an acceleration sensor, a proximity sensor, a geomagnetic sensor (or gyroscope), and a Digital Media Broadcasting (DMB) receiver, are not shown in the block diagram of FIG. 1, it will be apparent to those of ordinary skill in the art that these undepicted devices may also be included in the mobile terminal to provide their own functions. In addition, although a battery needed to drive the mobile terminal is not shown in the block diagram of FIG. 1, a built-in battery or a detachable battery may be included in the mobile terminal.

For example, an acceleration sensor may be used to detect movement of the mobile terminal by measuring the dynamic force such as accelerations, vibrations and shocks, and based thereon, to detect a display direction of the display 50 of the mobile terminal. The proximity sensor, which detects a user body's partial approach to the mobile terminal, may be used to prevent mal-operation of the mobile terminal supporting the touch screen feature. The gyroscope, which observes the dynamic movement of the rotating mobile terminal, may be used to detect the rotational motion of the mobile terminal in six axes (i.e., up/down, left/right, back/forth, x-axis, y-axis and z-axis) in cooperation with the acceleration sensor.

Figure 2:
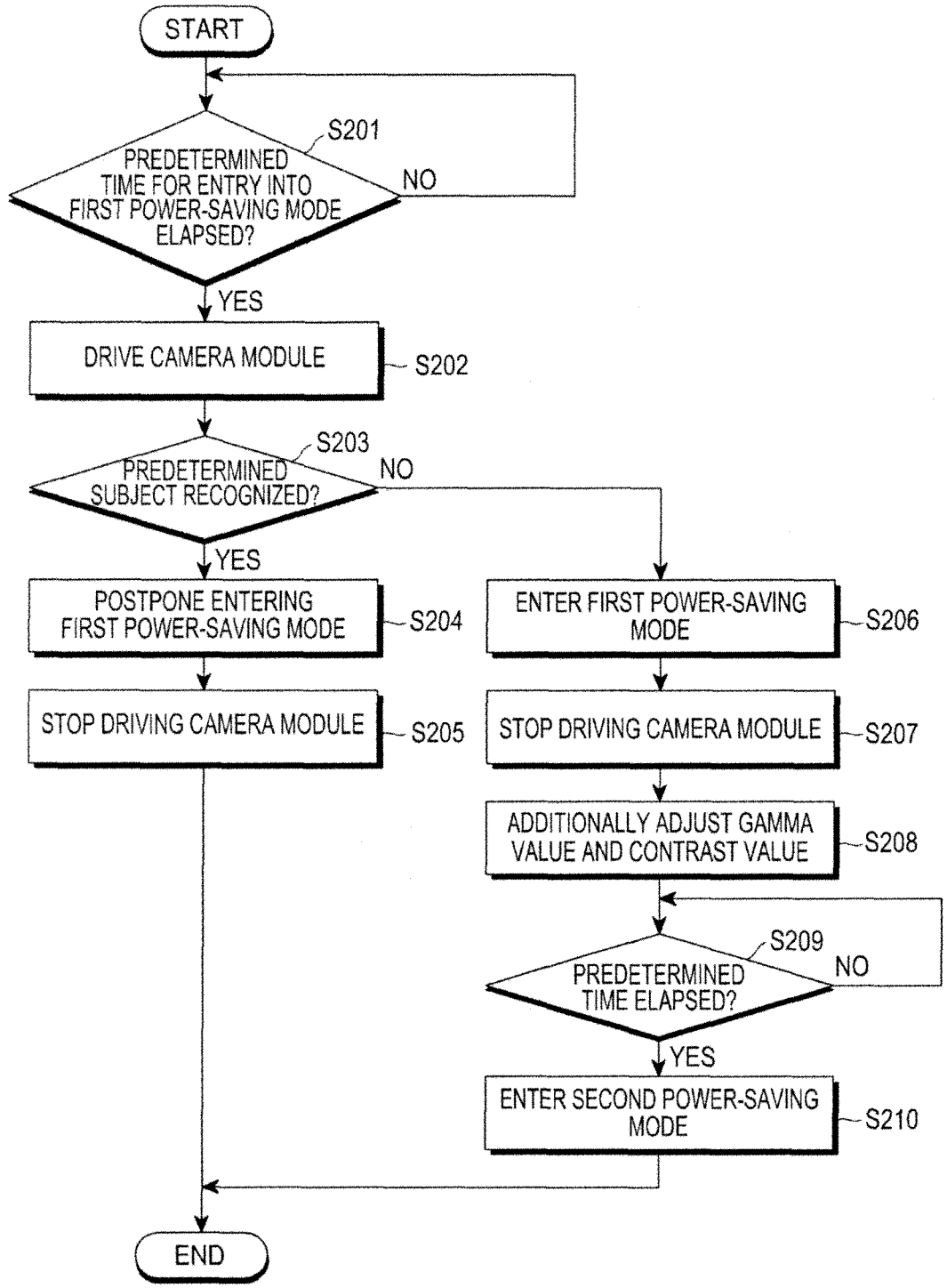
FIG. 2 is a flowchart showing a process of controlling an operation mode in a mobile terminal according to an embodiment of the present invention.

An embodiment of the present invention will be described below with reference to FIGS. 1 to 5B. FIG. 2 is a flowchart showing a process of controlling an operation mode in a mobile terminal according to an embodiment of the present invention. FIGS. 3A to 5B show first to third examples of a method of controlling an operation mode in a mobile terminal according to an embodiment of the present invention, respectively.

In steps S201 and S202, the controller 10 determines whether a predetermined time has elapsed, after a lapse of which the mobile terminal enters a first power-saving mode, and drives the camera module 40 if the predetermined time has elapsed.

In the past, the mobile terminal immediately enters the power-saving mode if a key input made by a user on the key input unit 27 or the touch screen of the display unit 50 is not received from the user for a predetermined time (e.g., 10 seconds) even when running a certain application (e.g., a web browser) and enjoying the content.

However, in accordance with an embodiment of the present invention, the controller 10 drives the camera module 40, instead of immediately entering the power-saving mode if there is no key or touch input on the screen or no manipulation of the terminal (e.g., tilting the mobile terminal horizontally or vertically) from the user for a predetermined time.

In steps S203 to S205, the controller 10 determines whether a predetermined subject is recognized by the camera module 40, and if the predetermined subject is recognized, the controller 10 delays the entering (or switching to) to the first power-saving mode and stops driving the camera module 40.

The controller 10 determines whether a predetermined subject (e.g., a person's face) is recognized, from image signals received from the driven camera module 40, and determines that the user is continuously using the mobile terminal, when the predetermined subject is recognized to eliminate unintended entry to the idle mode. Therefore, the controller 10 postpones entering the first power-saving mode for a predetermined time (e.g., 10 seconds) if a subject is recognized by the camera module 40.

Figure 3B:
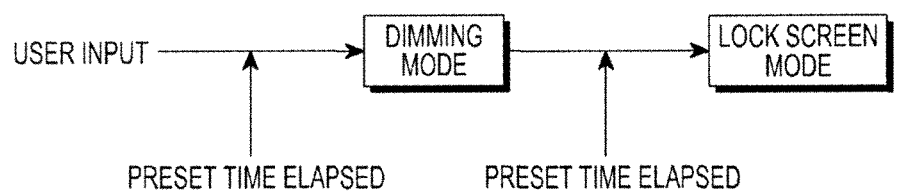

In an embodiment of the present invention, the first power-saving mode corresponds to the dimming mode and a below-described second power-saving mode corresponds to the lock screen mode. Referring to FIG. 3B, the dimming mode is an operation mode that the mobile terminal enters if there is no key input or touch input from the user for a predetermined time period, and the lock screen mode is an operation mode that the mobile terminal enters if there is no key input or touch input from the user during the dimming mode for a predefined time period.

Although it is assumed in step S203 that recognizing a predetermined subject captured by the camera module 40 corresponds to determining that the user is continuously using the mobile terminal, a new step may be added in which the controller 10 may more accurately determine whether the user is continuously using the mobile terminal. For example, a new step may be added in which the controller 10 determines whether the person's gaze faces toward the display 50 or the main body of the mobile terminal when a person's face is recognized in step S203, thus making it possible to more accurately determine whether the user is still using the mobile terminal. As is known in the art, checking the person's gaze may be achieved by recognizing the person's iris or movement of the person's iris, so a detailed description thereof will be omitted.

In steps S206 and S207, if it is determined in step S203 that the predetermined subject is not detected or not recognized, the controller 10 enters the first power-saving mode and then stops driving the camera module 40.

If the predetermined subject (e.g., a person's face) is not recognized by the camera module 40, the controller 10 controls the mobile terminal to enter the first power-saving mode, thereby determining that the user no longer uses or wish to operate the mobile terminal (or no longer gazes at the display 50 of the mobile terminal).

Figure 4A:
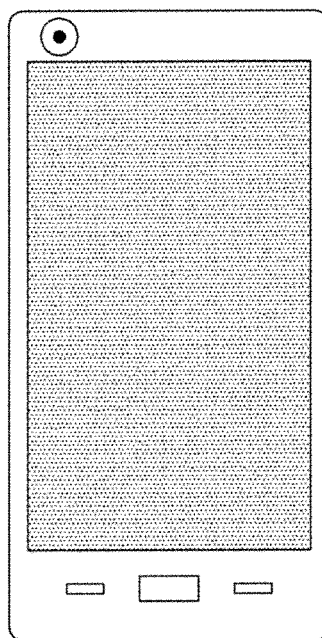
FIG. 4A and FIG. 4B show a second example of a method of controlling an operation mode in a mobile terminal according to an embodiment of the present invention.

As described above, in an embodiment of the present invention, the first power-saving mode corresponds to the dimming mode, so the controller 10 down-adjusts a display brightness of the display screen in step S206 as shown in FIG. 4A, thereby minimizing the power consumption by the display 50.

After entering the first power-saving mode, the controller 10 immediately stops driving the camera module 40 to also minimize the power consumption by the camera module 40.

In step S208, the controller 10 additionally adjusts a gamma value and a contrast value of the display 50.

Although the controller 10 may minimize the battery consumption of the mobile terminal as it enters the first power-saving mode (i.e., the dimming mode) and stops driving the camera module 40 in steps S206 and S207, the teachings of the present invention provides for the controller 10 to adjust a gamma value and a contrast value of the display 50 to correspond to the first power-saving mode (i.e., to minimize the power consumption by the display 50), thereby further minimizing the battery consumption during the first power-saving mode.

A display screen of the display 50 may display various different colors. Generally, the display 50 may consume more battery power when it displays the white pixels rather than the black pixels. Therefore, the controller 10 additionally adjusts (e.g., down-adjusts) a gamma value and a contrast value to display a display screen that is distorted such that the black pixels may outnumber the white pixels, in the state where a display brightness (of the display screen) of the display 50 decreases (for example, brightness properties of the display 50 are down-adjusted) compared to before the mobile terminal enters the dimming mode, as the mobile terminal enters the dimming mode.

Figure 5A:
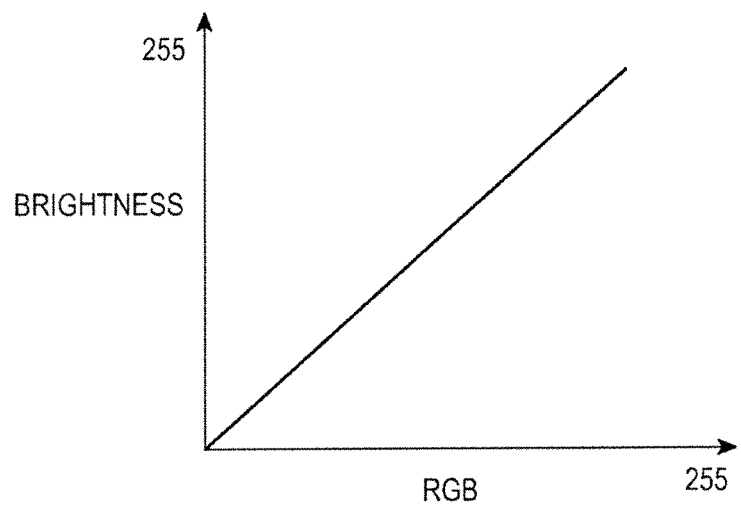
FIG. 5A and FIG. 5B show a third example of a method of controlling an operation mode in a mobile terminal according to an embodiment of the present invention.
Figure 5B:
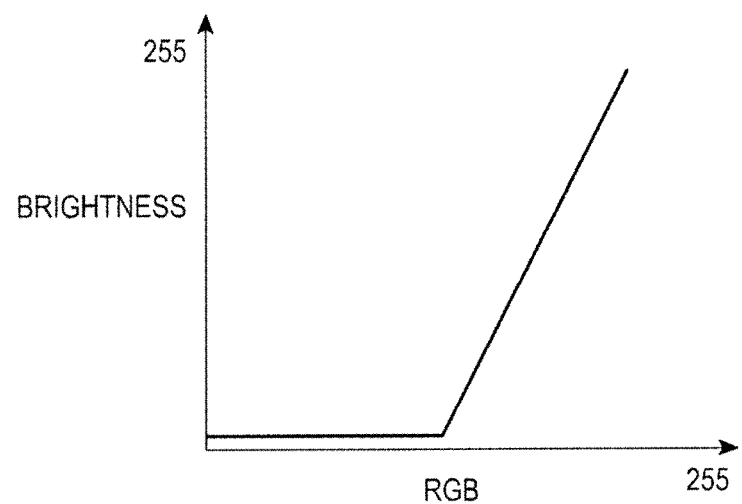

For example, FIG. 5A shows the general properties of the display 50, and if the brightness properties of the display 50 are decreased and the gamma and contrast properties of the display 50 are also additionally down-adjusted as the mobile terminal enters the first power-saving mode, the display 50 may have the properties shown in FIG. 5B. If its display properties are changed as shown in FIG. 5B, the display 50 may consume less power compared to when it has the display properties in FIG. 5A.

In steps S209 and S210, the controller 10 enters the second power-saving mode if a predetermined time period has elapsed after its entry into the first power-saving mode.

In other words, the controller 10 enters the second power-saving mode (or the lock screen mode), if the user does not use the mobile terminal and/or does not gaze at the display 50 of the mobile terminal for a predetermined time even after the mobile terminal enters the first power-saving mode.

Figure 4B:
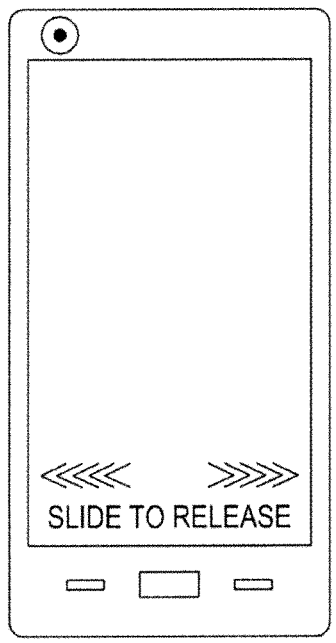

Upon entering the lock screen mode, the controller 10 stops driving the display 50. When the user manipulates keys later on to use again the mobile terminal, he or she needs to make a specific input (e.g., a slide-touch input) on the screen that is locked as shown in FIG. 4B.

As is apparent from the foregoing description, the present invention may improve the functionalities of the dimming mode and the lock screen mode, thereby minimizing power consumption of mobile terminals without causing inconvenience to the users during use of the mobile terminals, thus making it possible to further minimize the power consumption even in the dimming mode compared to in the conventional dimming mode.

The above-described methods according to the present invention can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating an electronic device, the method comprising:
   determining whether an input is received with respect to the electronic device for a first specified period of time while a display of the electronic device is operating at a first brightness;
   capturing an image using an image sensor operatively coupled with the electronic device when no input has been received with respect to the electronic device for the first specified period of time while the display of the electronic device operates at the first brightness;
   determining whether a specified object is recognized in the image;
   changing operation of the display of the electronic device from the first brightness to a second brightness when determining that the specified object is not recognized in the image, wherein a luminance of the display at the first brightness is greater than a luminance of the display at the second brightness;

maintaining operation of the display at the first brightness when determining that the specified object is recognized in the image;

determining whether an input is received with respect to the electronic device for a second specified period of time after the display of the electronic device is changed to the second brightness; and changing operation of the display of the electronic device from the second brightness to a deactivated state when no input has been received with respect to the electronic device for the second specified period of time.

2. The method of claim 1, further comprising:
capturing a second image using the image sensor after changing operation of the display from the first brightness to the second brightness;
determining whether the specified object is recognized in the second image; and
maintaining the display on when the specified object is recognized in the second image and no input is received with respect to the electronic device for the second specified period of time.

3. The method of claim 1, further comprising:
when changing operation of the display to the deactivated state, executing a lock state for the electronic device.

4. The method of claim 3, further comprising:
in response to detecting an event while the electronic device is in the lock state, displaying a lock screen; and
releasing the lock state in response to detecting a specific user input when the lock screen is displayed.

5. The method of claim 1, wherein changing operation of the display from the first brightness to the second brightness comprises:
adjusting at least one of a brightness value, a gamma value, and a contrast value of the display.

6. The method of claim 1, wherein when the operation of the display is changed to the second brightness or to the deactivated state, the method further comprises outputting at least one of a sound, a vibration, and a blinking light by the electronic device.

7. The method of claim 3, wherein determining whether the specified object is recognized in the image comprises:
determining whether a face is detected within the image.

8. The method of claim 7, wherein the face is preregistered and stored in the electronic device.

9. The method of claim 7, wherein determining whether the specified object is recognized in the image comprises:
determining whether a user's gaze is oriented towards the display.

10. The method of claim 1, wherein determining whether the specified object is recognized in the image comprises:
determining whether at least one of an iris of a user and a movement of the iris is recognized in the image.

11. A mobile terminal comprising:
a display;
an image sensor; and
a processor electrically coupled with the image sensor, the processor is configured to:
determine whether an input is received with respect to the mobile terminal for a specified period of time while the display operates at a first brightness,
capture an image using the image sensor when no input has been received with respect to the mobile terminal for the specified period of time while the display operates at the first brightness,
change operation of the display from the first brightness to a second brightness when determining that a specified object is not recognized in the captured image, wherein a luminance of the display at the first brightness is greater than a luminance of the display at the second brightness,
maintain operation of the display at the first brightness when determining that the specified object is recognized in the image,
determine whether an input is received for a second specified period of time after the display is changed to the second brightness, and
change operation of the display from the second brightness to a deactivated state when no input has been received for the second specified period of time.

12. The mobile terminal of claim 11, wherein the processor is further configured to:
capture a second image using the image sensor after changing operation of the display from the first brightness to the second brightness;
determine whether the specified object is recognized in the second image; and
maintain the display on when the specified object is recognized in the second image and no input is received for the second specified period of time.

13. The mobile terminal of claim 11, wherein the processor is further configured to:
when changing operation of the display to the deactivated state, execute a lock state.

14. The mobile terminal of claim 13, wherein the processor is further configured to:
in response to detecting an event while the mobile terminal is in the lock state, display a lock screen; and
release the lock state in response to detecting a specific user input when the lock screen is displayed.

15. The mobile terminal of claim 11, wherein the changing operation of the display from the first brightness to the second brightness comprises:
adjusting at least one of a brightness value, a gamma value, and a contrast value of the display.

16. The mobile terminal of claim 11, wherein when the operation of the display is changed to the second brightness or to the deactivated state, the processor is further configured to output at least one of a sound, a vibration, and a blinking light.

17. The mobile terminal of claim 13, wherein determining whether the specified object is recognized in the image comprises:
determining whether a face is detected within the image.

18. The mobile terminal of claim 17, wherein the face is preregistered and stored in the mobile terminal.

19. The mobile terminal of claim 17, wherein determining whether the specified object is recognized in the image comprises:
determining whether a user's gaze is oriented towards the display.

20. The mobile terminal of claim 17, wherein determining whether the specified object is recognized in the image comprises:
determining whether at least one of an iris of a user and a movement of the iris is recognized in the image.

* * * * *